United States Patent
Runeson

(10) Patent No.: US 9,692,728 B2
(45) Date of Patent: Jun. 27, 2017

(54) PACKET FILTERING AT AN APPLICATION-PROCESSOR-TO-MODEM INTERFACE

(71) Applicant: Telefonaktiebolaget L M Ericsson (publ), Stockholm (SE)

(72) Inventor: Stefan Runeson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 201 days.

(21) Appl. No.: 14/307,627

(22) Filed: Jun. 18, 2014

(65) Prior Publication Data
US 2015/0372979 A1    Dec. 24, 2015

(51) Int. Cl.
*H04L 29/06* (2006.01)
*H04W 12/00* (2009.01)

(52) U.S. Cl.
CPC ...... *H04L 63/0254* (2013.01); *H04L 63/0236* (2013.01); *H04W 12/00* (2013.01)

(58) Field of Classification Search
CPC . H04L 63/10; H04L 63/1441; H04L 63/0254; H04L 63/0236; H04W 12/00
See application file for complete search history.

(56) References Cited

U.S. PATENT DOCUMENTS 6,092,110 A * 7/2000 Maria .................... H04L 29/06
                                                                709/225
2003/0028674 A1 * 2/2003 Boden ................ H04L 63/0227
                                                                709/250
2004/0073671 A1 * 4/2004 Maria .................... H04L 29/06
                                                                709/225

(Continued)

FOREIGN PATENT DOCUMENTS

EP      1328091 A1    7/2003
EP      1703672 A1    9/2006
WO    2013053550 A1    4/2013

OTHER PUBLICATIONS

IEEE, "IEEE Std 802.1Q", IEEE Standard for Local and metropolitan area networks, Virtual Bridged Local Area Networks, May 19, 2006, 1-303.

*Primary Examiner* — Amir Mehrmanesh
(74) *Attorney, Agent, or Firm* — Murphy, Bilak & Homiller, PLLC

(57) ABSTRACT

An application processor circuit comprises an interface circuit configured to communicate with a separate modem device, a user application module configured to execute one or more user-installed applications, and a core application module configured to execute one or more core applications and to access one or more modem services on the modem device, using the interface circuit and an IP socket application protocol interface (API), wherein packets sent to the modem device for accessing the one or more modem services include a destination IP address corresponding to the modem device. The application processor circuit further comprises an IP filter module configured to identify and discard outbound packets that include a destination IP address corresponding to the modem device and that originate from any of one or more disallowed applications in the application processor, without sending the identified packets to the modem device.

15 Claims, 4 Drawing Sheets

(56) References Cited

U.S. PATENT DOCUMENTS

| | | | |
|---|---|---|---|
| 2006/0026682 A1* | 2/2006 | Zakas | H04L 29/06 |
| | | | 726/22 |
| 2007/0156919 A1 | 7/2007 | Potti et al. | |
| 2009/0209291 A1* | 8/2009 | Ramprasad | H04W 12/08 |
| | | | 455/564 |
| 2011/0249564 A1* | 10/2011 | Cho | H04L 43/028 |
| | | | 370/241 |
| 2011/0280187 A1 | 11/2011 | Meyer et al. | |
| 2011/0314145 A1* | 12/2011 | Raleigh | H04L 41/0893 |
| | | | 709/224 |
| 2013/0170451 A1* | 7/2013 | Krause | H04L 69/14 |
| | | | 370/329 |

* cited by examiner

| ETHERNET | | | | |
|---|---|---|---|---|
| NCM | | | SHARED MEMORY | |
| CDC | | | LLI | PCIe |
| USB 2.0 / 3.0 | | | | |
| USB 2.0 PHY | HSIC PHY | M-PHY | M-PHY | PCIe PHY |
| USB 2.0 | HSIC | SSIC | LLI | PCIe |

| AT | Debug | Log | File | ... |
|---|---|---|---|---|
| TCP/UDP ||||||
| IP ||||||
| Ethernet ||||||
FIG. 3
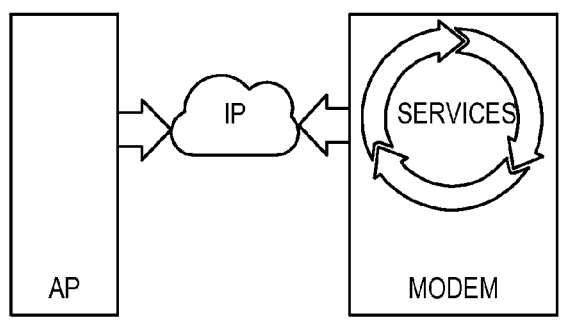
FIG. 4
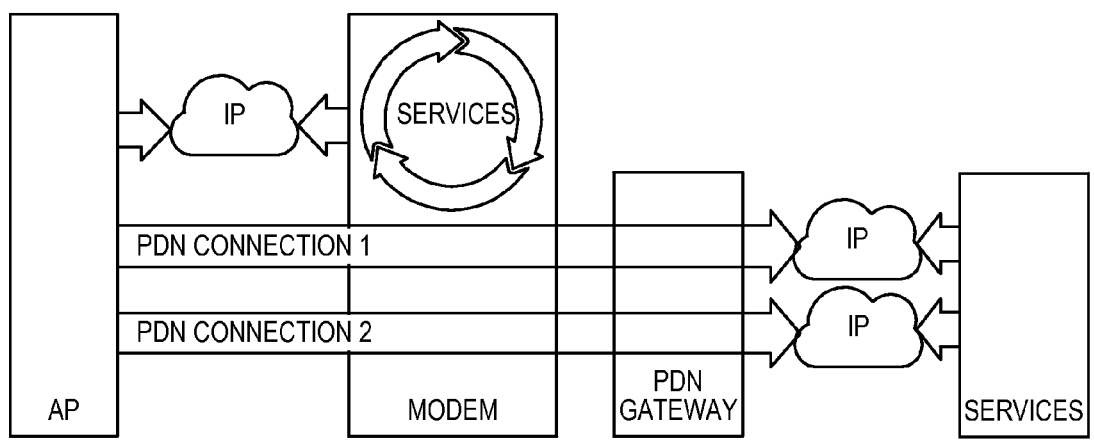
FIG. 5

US 9,692,728 B2

PACKET FILTERING AT AN APPLICATION-PROCESSOR-TO-MODEM INTERFACE

TECHNICAL FIELD

The presently disclosed techniques relate generally to devices for use in wireless communication networks, and more particularly relate to an interface between a modem device and an application processor device in wireless communications devices.

BACKGROUND

Many wireless communication devices, including simple cellular telephones, so-called smart phones, and wireless tablet devices, include a cellular modem device. A cellular modem device of a particular type (e.g., from a particular manufacturer and/or for a particular radio access technology) may be used in many different types of products. As a result, the integration of the modem device into these various products can put a variety of dissimilar requirements on the modem device's interfaces.

FIG. 1 illustrates several dimensions of these varying requirements. The interface to the modem device may work with any one or more of several physical interfaces, such as the Universal Serial Bus (USB), the USB High-Speed Inter-Chip (HSIC) interface, the USB Super-Speed Inter-Chip (SSIC), The Peripheral Component Interconnect express (PCIe) interface, and the Low Latency Interface (LLI). The modem interface shall also be compatible with a variety of different application processors, e.g., the application processors in smartphones or tablet computers, the CPUs in desktop or laptop computers, and control systems of various types in Machine-to-Machine (M2M) applications. Finally, the modem interface shall work with different operating systems, such as Linux, Windows, OS X, and various real-time operating systems.

A common denominator for all physical interfaces, all applications processors, and most operating systems is a general ability to handle Ethernet devices. It is possible to emulate an Ethernet interface on all these physical interfaces and all application processors, and most operating systems handle Ethernet devices. A natural choice is thus to expose the modem as an Ethernet interface and hide all differences between various physical interfaces below Ethernet.

This exposure of the modem device to application processors as an Ethernet device is illustrated in FIG. 2. As suggested by the figure, the modem device may support interconnections to the applications processor via any of several physical interfaces, such as USB 2.0, HSIC, SSIC, LLI, and PCIe. An Ethernet layer sits on top of each of these physical interfaces, allowing an applications processor that supports any one or more of these physical interfaces to communicate with the modem device at the Ethernet layer, i.e., using Ethernet frames. As seen in the figure, the Ethernet layer sits on top of a Network Control Model (NCM) layer and a Communications Device Class (CDC) layer for the USB-related physical interfaces (USB 2.0, HSIC, and SSIC), and sits on top of a shared memory for the LLI and PCIe physical interfaces.

Another common denominator for all application processors and most operating systems is the ability to handle an Internet Protocol (IP) socket applications programming interface (API). A natural choice, therefore, is for the modem device to expose all modem services to the application processor on an IP socket API to the application processor. This is shown in FIG. 3, where several modem services, including a control channel for modem control (e.g., using so-called AT commands), debugging, and logging services are provided to an application processor device via a TCP/UDP layer and an IP layer, on top of the Ethernet interface discussed above. With this configuration, a local IP network between the modem device and the application processor is used to expose modem services to the application processor, on an IP socket API. This is shown generally in the block diagram of FIG. 4.

SUMMARY

One problem with systems that employ separate application processor circuit and modem devices is that the modem services on the modem device have to be protected from misuse by malware on the application processor. Typically, certain applications are allowed to access modem services, while others, such as user-installed applications, must not access modem services.

Several embodiments of the methods and apparatus disclosed herein protect access to modem services by filtering traffic to modem services in the application processor, and discarding packets that are from applications that are not trusted. An example application processor device thus comprises an interface circuit configured to communicate with a separate modem device, a user application module configured to execute one or more user-installed applications, and a core application module configured to execute one or more core applications and to access one or more modem services on the modem device, using the interface circuit and an IP socket application protocol interface (API), wherein packets sent to the modem device for accessing the one or more modem services include a destination IP address corresponding to the modem device. The application processor device further comprises an IP filter module configured to identify and discard outbound packets that include a destination IP address corresponding to the modem device and that originate from any of one or more disallowed applications in the application processor, without sending the identified packets to the modem device.

In some embodiments, the IP filter module is configured to identify packets that originate from a disallowed application by identifying packets that originate from a disallowed category of applications. For example, the IP filter module may be configured to identify packets that originate from a disallowed category of applications by determining an operating system access group for the originating application and determining that the operating system access group does not match any of one or more allowed operating system access groups. Alternatively, the IP filter module may be configured to identify packets that originate from a disallowed category of applications by determining an operating system access group for the originating application and determining that the operating system access group matches one or more disallowed operating system access groups. Similarly, the IP filter module may be configured to identify packets that originate from a disallowed category of applications by distinguishing between packets that originate from an allowed "radio application" category and packets that originate from a disallowed "user application" category.

In some embodiments, the IP filter module is configured to identify packets that originate from a disallowed application by determining an application identity for the originating application and determining that the application identity matches one or more disallowed application identities. Alternatively, the IP filter module may be configured to identify packets that originate from a disallowed application by determining an application identity for the originating application and determining that the application identity does not match any of one or more allowed application identities.

Corresponding method and circuit structures are disclosed herein as well. For instance, an example method, implemented in an application processor circuit that comprises a processing circuit and an interface circuit configured to communicate with a modem device, includes: accessing one or more modem services on the modem device, using the interface circuit and an IP socket application protocol interface (API), where packets sent to the modem device for accessing the one or more modem services include a destination IP address corresponding to the modem device; and identifying and discarding outbound packets that include a destination IP address corresponding to the modem device and that originate from a disallowed application in the application processor, without sending the identified packets to the modem device. The variations of IP filter module functionality summarized above apply equally to this example method.

Likewise, an example application processor circuit corresponding to the above-summarized method and device includes a processing circuit and an interface circuit configured to communicate with a modem device, where the processing circuit is configured to: access one or more modem services on the modem device, using the interface circuit and an IP socket application protocol interface (API), where packets sent to the modem device for accessing the one or more modem services include a destination IP address corresponding to the modem device; and identify and discard outbound packets that include a destination IP address corresponding to the modem device and that originate from any of one or more disallowed applications in the application processor, without sending the identified packets to the modem device. Again, the several variations of IP filter module functionality summarized above apply equally to example application processor circuit, where the IP filter module functionality is performed by the processing circuit.

BRIEF DESCRIPTION OF THE DRAWINGS

The accompanying drawings, which are included to provide a further understanding of the disclosure and are incorporated in and constitute a part of this disclosure, illustrate certain non-limiting embodiment(s) of the methods and apparatus described herein. In the drawings:

FIG. 3 illustrates the exposure of example modem services to an application processing, using an IP socket application programming interface (API);

FIG. 4 illustrates a local IP network between a modem device and an application processor;

FIG. 5 is a block diagram illustrating a local IP network between a modem device and an application processor and between the application processor and remote IP network(s) via Packet Data Network (PDN) connections;

DETAILED DESCRIPTION

Figures 1, 2:
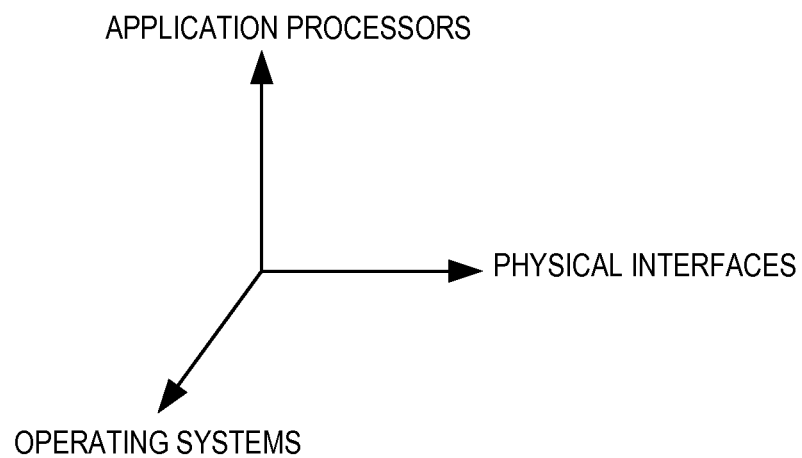
FIG. 1 illustrates several different design aspects that impact modem integration.
FIG. 2 illustrates the exposure of a modem device as an Ethernet device to application processor, where such exposure is irrespective of the physical interface.

In the following detailed description, numerous specific details are set forth in order to provide a thorough understanding of the techniques and apparatus disclosed herein. However, it will be understood by those skilled in the art that the present techniques may be practiced without these specific details. In other instances, well-known methods, procedures, components and circuits have not been described in detail so as not to obscure the present disclosure.

One problem that arises with current modem devices is that the application processor would like to connect to one or more different IP networks, through the modem device, over the Ethernet interface provided by the modem device. In particular, one or more applications on the application processor would like to use a remote IP network via a Packet Data Network (PDN) connection to a PDN Gateway in the mobile communications network. In some cases, the application processor would like to connect to several remote IP networks simultaneously, via multiple PDN connections. At the same time, the application processor would also like to use the local IP network and utilize the modem services provided through the modem's TCP/IP or UDP/IP stack. This is shown in FIG. 5, which illustrates a local IP session between the application processor AP and the modem device as well as two IP-based data sessions between the application processor and remote IP-based services, where the IP-based data sessions pass through the modem device and a PDN gateway in the mobile communications network.

Another problem is that the modem services have to be protected from misuse by malware on the application processor. Typically, certain applications are allowed to access modem services, while others, such as user-installed applications, must not access modem services. The former may be referred to as "Core Applications," for example, while the latter may be referred to as "User Applications." Other designations may be used to distinguish between applications that are allowed to access modem services and those that aren't, of course, and it may be the case that a particular platform supports mechanisms for identifying certain user-installed applications as "safe," and thus allowed to access modem services. Nevertheless, it is expected that in many systems at least some user-installed applications should be restricted from accessing the modem services.

Several embodiments of the presently disclosed techniques and apparatus address this problem including an "IP filter" function in the application processor. This IP filter function uses the destination IP address of outbound packets generated by applications running on the processor and, in some embodiments, the destination port numbers, to identify packets that are targeted to the separate modem device's destination IP address, as opposed to those packets targeted to a remote network's IP address. This can be done, for example, using iptables in Linux. The IP filter function then selectively discards those packets that are targeted to the modem's destination IP address and that originate from applications that are not allowed to access the modem services. The distinguishing between packets from Core Apps and User Apps or, more generally, between applications that are allowed to access modem services and those that are not, can be based on any of several application-specific parameters, such as the application identity, an operating system access group associated with the application, or the like.

Figure 6:
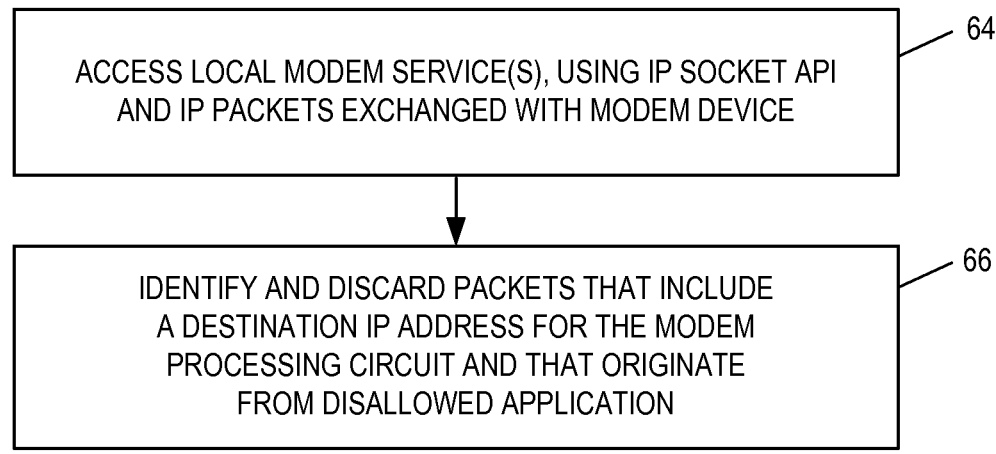
FIG. 6 is a process flow diagram illustrating an example method according to the presently disclosed techniques, as carried out by an example application processor circuit.

FIG. 6 is a process flow diagram illustrating an example method that addresses these problems, as might be implemented in an application processor circuit that comprises a processing circuit and an interface circuit configured to communicate with a modem device. As seen at block 64, the method includes accessing one or more modem services on the modem device, using the interface circuit and an IP socket application protocol interface (API), such that packets sent to the modem device for accessing the modem services include a destination IP address corresponding to the modem device. As shown at block 66, the method further includes identifying and discarding outbound packets that include a destination IP address corresponding to the modem device and that originate from a disallowed application in the application processor, without sending the identified packets to the modem device.

In some embodiments, packets that originate from a disallowed application are identified by identifying packets that originate from a disallowed category of applications. This may comprise, for example, determining an operating system access group for the originating application and determining that the operating system access group does not match any of one or more allowed operating system access groups. Alternatively, this may comprise determining an operating system access group for the originating application and determining that the operating system access group matches one or more disallowed operating system access groups. Similarly, this may comprise distinguishing between packets that originate from an allowed "radio application" category and packets that originate from a disallowed "user application" category.

In some embodiments, identifying packets that originate from a disallowed application comprises determining an application identity for the originating application and determining that the application identity matches one or more disallowed application identities. Alternatively, identifying packets that originate from a disallowed application comprises determining an application identity for the originating application and determining that the application identity does not match any of one or more allowed application identities.

Figure 7:
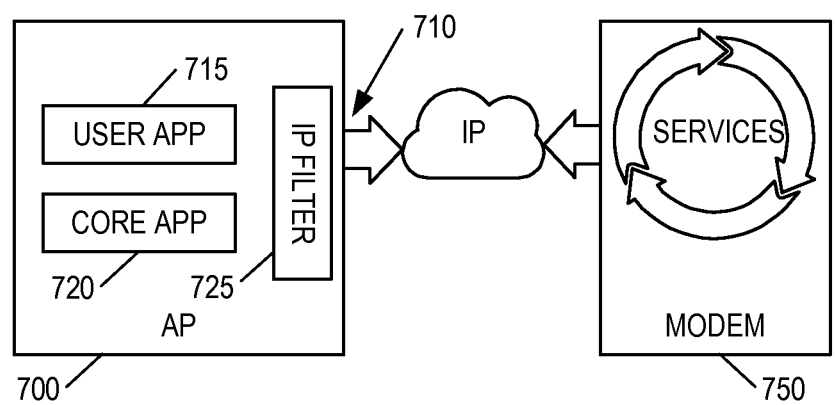
FIG. 7 is a block diagram illustrating the filtering of IP packets in an application processor circuit.

FIG. 7 is a block diagram illustrating an example application processor device 700 that operates in accordance with the above-described techniques. As seen in the figure, the application processor device includes a user application module 715, which is configured to execute one or more user-installed applications, as well as a core application module 720 configured to execute one or more core applications. While the user application module 715 and core application module 720 may share physical resources (e.g., microprocessor and memory resources), the user application module 715 typically allows the user to download, update, delete, and execute any of a variety of user-supplied applications, while the core application module 720 may be configured to generally prevent or restrict user modification of one or more core applications. Core application module 720 is configured to access one or more modem services on the modem device 750, using an interface circuit 710 and an IP socket application protocol interface (API), such that packets sent to the modem device 750 for accessing the one or more modem services include a destination IP address corresponding to the modem device. Core application module 720 may be configured to set up one or more IP connections to remote data networks, using the modem services, for use by one or more user applications executed by user application module 715. The user applications, as a rule, should not be accessing the modem services directly.

To enforce this rule, the illustrated application processor device 700 includes an IP filter module 725, which is configured to identify and discard outbound packets that include a destination IP address corresponding to the modem device and that originate from any of one or more disallowed applications in the application processor, without sending the identified packets to the modem device. As discussed above in describing the process flow diagram of FIG. 6, the IP filter module 725 in some embodiments is configured to identify packets that originate from a disallowed application by identifying packets that originate from a disallowed category of applications. This may be done, for example, by determining an operating system access group for the originating application and determining that the operating system access group does not match any of one or more allowed operating system access groups, or by determining an operating system access group for the originating application and determining that the operating system access group matches one or more disallowed operating system access groups, or by distinguishing between packets that originate from an allowed "radio application" category and packets that originate from a disallowed "user application" category. The IP filter module may identify packets that originate from a disallowed application by determining an application identity for the originating application and determining that the application identity matches one or more disallowed application identities, in some embodiments, or, in others, by determining an application identity for the originating application and determining that the application identity does not match any of one or more allowed application identities.

Figure 8:
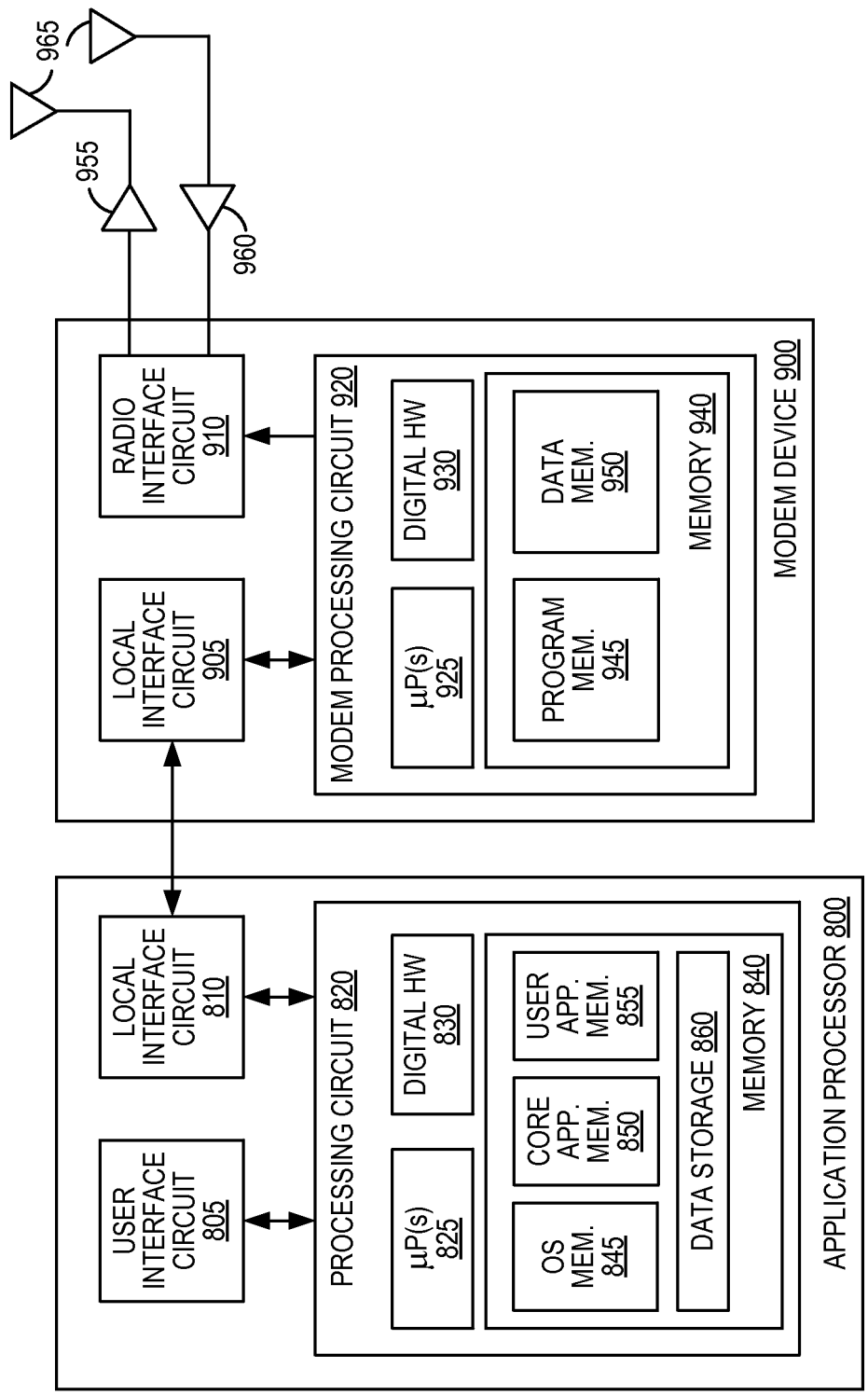
FIG. 8 is a block diagram illustrating functional components of an example modem device and an example application processor circuit.

FIG. 8 illustrates an example modem device 900 and an example application processor circuit 800, where the application processor circuit 800 is configured to carry out one or more of the methods described above. Modem device 900 includes a radio interface circuit 910 configured to communicate with a remote device, using radio circuits 955 and 960 and antennas 965. Modem device 900 further includes a local interface circuit 905 configured to communicate with application processor circuit 800 using Ethernet frames and, for example, one or more of the physical interfaces discussed above in connection with FIG. 2. Modem device still further includes a modem processing circuit 920, which is configured to, among other things, provide modem services to application processor circuit 800, thus allowing application processor circuit 800 to set up an IP data session between an application running on the application processor circuit 800 and a remote IP network.

More particularly, modem processor circuit 920 includes one or more microprocessors or microcontrollers 925, as well as other digital hardware 930, which may include digital signal processors (DSPs), special-purpose digital logic, and the like. Modem processor circuit 920 further includes a memory circuit 940, which is configured to provide program memory 945 and data memory 945; either or both of microprocessor(s) 925 and digital hardware 930 may be configured to execute program code stored in program memory 945, using data memory 950. Because the various details and engineering tradeoffs associated with the design of processing circuitry for mobile devices and the like are well known and are unnecessary to a full understanding of the invention, additional details are not shown here.

The program code stored in the program memory portion 945 of memory 940, which may comprise one or several types of memory such as read-only memory (ROM), random-access memory, cache memory, flash memory devices, optical storage devices, etc., includes program instructions for executing one or more telecommunications and/or data communications protocols, using radio interface circuit 910, as well as instructions for controlling local interface 905 and communicating with application processor 800 and, in some embodiments, one or more peripheral devices.

FIG. 8 also illustrates details of an example application processor circuit 800, which operates with the modem device 900 described above. The application processor circuit 800 comprises one or more user-interface circuits 805, which may include, for example, a touch-screen interface, a keypad, audio input and output circuits, etc. Application processor circuit 800 further comprises an interface circuit 810 configured to communicate with modem device 900, and a processing circuit 820.

Processing circuit 820 includes one or more microprocessors or microcontrollers 825, as well as other digital hardware 830, which may include digital signal processors (DSPs), special-purpose digital logic, and the like. Processing circuit 820 further includes a memory circuit 840, which in this example is configured to provide operating system memory 845, core program memory 850, user application memory 855, and data storage memory 860. Either or both of microprocessor(s) 825 and digital hardware 830 may be configured to execute program code stored in operating system memory 845, core program memory 850, and/or user application memory 855, using data storage memory 860. Because the various details and engineering tradeoffs associated with the design of processing circuitry for mobile devices and the like are well known and are unnecessary to a full understanding of the invention, additional details are not shown here.

The program code stored in the program storage portions of memory 840, which may comprise one or several types of memory such as read-only memory (ROM), random-access memory, cache memory, flash memory devices, optical storage devices, etc., includes program instructions for controlling user-interface circuits 805, controlling local interface 810, and program instructions for handling core applications and user applications. Memory 840 may further contain instructions for carrying out one or more of the techniques detailed herein, in several embodiments, including, for example, the techniques illustrated in FIG. 6. Thus, for example, processing circuit 820 may be configured, with appropriate program instructions in memory 840, to: access one or more modem services on the modem device 900, using the interface circuit 810 and an IP socket application protocol interface (API), wherein packets sent to the modem device 900 for accessing the one or more modem services include a destination IP address corresponding to the modem device 900; and identify and discard outbound packets that include a destination IP address corresponding to the modem device 900 and that originate from any of one or more disallowed applications in the application processor, without sending the identified packets to the modem device 900. The several variations of this general technique described above apply equally to this example embodiment of an application processor circuit 800.

In the above-description of various embodiments of the presently disclosed techniques, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when a node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present description, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the inventive techniques and apparatus disclosed herein. All such variations and modifications are intended to be included herein within the scope of the present disclosure.

What is claimed is:

1. An application processor circuit comprising:
   an interface circuit configured to communicate with a modem device; and
   a processing circuit;
   wherein the processing circuit is configured to:
   access one or more modem services on the modem device, using the interface circuit and an IP socket application protocol interface (API), wherein packets sent to the modem device for accessing the one or more modem services include a destination IP address corresponding to the modem device; and
   identify and discard outbound packets that include a destination IP address corresponding to the modem device and that originate from any of one or more disallowed applications in the application processor, without sending the identified packets to the modem device,
   wherein the processing circuit is configured to identify packets that originate from a disallowed application by identifying packets that originate from a disallowed category of applications, and
   wherein the processing circuit is configured to identify packets that originate from a disallowed category of applications by determining an operating system access group for the originating application and determining that the operating system access group does not match any of one or more allowed operating system access groups.

2. The application processor circuit of claim 1, wherein the processing circuit is configured to identify packets that originate from a disallowed application by determining an application identity for the originating application and determining that the application identity matches one or more disallowed application identities.

3. The application processor circuit of claim 1, wherein the processing circuit is configured to identify packets that originate from a disallowed application by determining an application identity for the originating application and determining that the application identity does not match any of one or more allowed application identities.

4. An application processor circuit comprising:
   an interface circuit configured to communicate with a modem device; and
   a processing circuit;
   wherein the processing circuit is configured to:
   access one or more modem services on the modem device, using the interface circuit and an IP socket application protocol interface (API), wherein packets sent to the modem device for accessing the one or more modem services include a destination IP address corresponding to the modem device; and
   identify and discard outbound packets that include a destination IP address corresponding to the modem device and that originate from any of one or more disallowed applications in the application processor, without sending the identified packets to the modem device,
   wherein the processing circuit is configured to identify packets that originate from a disallowed application by identifying packets that originate from a disallowed category of applications, and
   wherein the processing circuit is configured to identify packets that originate from a disallowed category of applications by determining an operating system access group for the originating application and determining that the operating system access group matches one or more disallowed operating system access groups.

5. An application processor circuit comprising:
   an interface circuit configured to communicate with a modem device; and
   a processing circuit;
   wherein the processing circuit is configured to:
   access one or more modem services on the modem device, using the interface circuit and an IP socket application protocol interface (API), wherein packets sent to the modem device for accessing the one or more modem services include a destination IP address corresponding to the modem device; and identify and discard outbound packets that include a destination IP address corresponding to the modem device and that originate from any of one or more disallowed applications in the application processor, without sending the identified packets to the modem device, wherein the processing circuit is configured to identify packets that originate from a disallowed application by identifying packets that originate from a disallowed category of applications, and wherein the processing circuit is configured to identify packets that originate from a disallowed category of applications by distinguishing between packets that originate from an allowed "radio application" category and packets that originate from a disallowed "user application" category.

6. A method, in an application processor circuit that comprises a processing circuit and an interface circuit configured to communicate with a modem device, the method comprising:

accessing one or more modem services on the modem device, using the interface circuit and an IP socket application protocol interface (API), wherein packets sent to the modem device for accessing the one or more modem services include a destination IP address corresponding to the modem device; and identifying and discarding outbound packets that include a destination IP address corresponding to the modem device and that originate from a disallowed application in the application processor, without sending the identified packets to the modem device, wherein identifying packets that originate from a disallowed application comprises identifying packets that originate from a disallowed category of applications, and wherein identifying packets that originate from a disallowed category of applications comprises determining an operating system access group for the originating application and determining that the operating system access group does not match any of one or more allowed operating system access groups.

7. The method of claim 6, wherein identifying packets that originate from a disallowed application comprises determining an application identity for the originating application and determining that the application identity matches one or more disallowed application identities.

8. The method of claim 6, wherein identifying packets that originate from a disallowed application comprises determining an application identity for the originating application and determining that the application identity does not match any of one or more allowed application identities.

9. A method, in an application processor circuit that comprises a processing circuit and an interface circuit configured to communicate with a modem device, the method comprising:

accessing one or more modem services on the modem device, using the interface circuit and an IP socket application protocol interface (API), wherein packets sent to the modem device for accessing the one or more modem services include a destination IP address corresponding to the modem device; and identifying and discarding outbound packets that include a destination IP address corresponding to the modem device and that originate from a disallowed application in the application processor, without sending the identified packets to the modem device, wherein identifying packets that originate from a disallowed application comprises identifying packets that originate from a disallowed category of applications, and wherein identifying packets that originate from a disallowed category of applications comprises determining an operating system access group for the originating application and determining that the operating system access group matches one or more disallowed operating system access groups.

10. A method, in an application processor circuit that comprises a processing circuit and an interface circuit configured to communicate with a modem device, the method comprising:

accessing one or more modem services on the modem device, using the interface circuit and an IP socket application protocol interface (API), wherein packets sent to the modem device for accessing the one or more modem services include a destination IP address corresponding to the modem device; and identifying and discarding outbound packets that include a destination IP address corresponding to the modem device and that originate from a disallowed application in the application processor, without sending the identified packets to the modem device, wherein identifying packets that originate from a disallowed application comprises identifying packets that originate from a disallowed category of applications, and wherein identifying packets that originate from a disallowed category of applications comprises distinguishing between packets that originate from an allowed "radio application" category and packets that originate from a disallowed "user application" category.

11. An application processor device comprising:

an interface circuit configured to communicate with a modem device;

a user application module configured to execute one or more user-installed applications;

a core application module configured to execute one or more core applications and to access one or more modem services on the modem device, using the interface circuit and an IP socket application protocol interface (API), wherein packets sent to the modem device for accessing the one or more modem services include a destination IP address corresponding to the modem device; and an IP filter module configured to identify and discard outbound packets that include a destination IP address corresponding to the modem device and that originate from any of one or more disallowed applications in the application processor, without sending the identified packets to the modem device, wherein the IP filter module is configured to identify packets that originate from a disallowed application by identifying packets that originate from a disallowed category of applications, and wherein the IP filter module is configured to identify packets that originate from a disallowed category of applications by determining an operating system access group for the originating application and determining that the operating system access group does not match any of one or more allowed operating system access groups.

12. The application processor device of claim 11, wherein the IP filter module is configured to identify packets that originate from a disallowed application by determining an application identity for the originating application and determining that the application identity matches one or more disallowed application identities.

13. The application processor device of claim 11, wherein the IP filter module is configured to identify packets that originate from a disallowed application by determining an application identity for the originating application and determining that the application identity does not match any of one or more allowed application identities.

14. An application processor device comprising:
an interface circuit configured to communicate with a modem device;
a user application module configured to execute one or more user-installed applications;
a core application module configured to execute one or more core applications and to access one or more modem services on the modem device, using the interface circuit and an IP socket application protocol interface (API), wherein packets sent to the modem device for accessing the one or more modem services include a destination IP address corresponding to the modem device; and
an IP filter module configured to identify and discard outbound packets that include a destination IP address corresponding to the modem device and that originate from any of one or more disallowed applications in the application processor, without sending the identified packets to the modem device,
wherein the IP filter module is configured to identify packets that originate from a disallowed application by identifying packets that originate from a disallowed category of applications, and
wherein the IP filter module is configured to identify packets that originate from a disallowed category of applications by determining an operating system access group for the originating application and determining that the operating system access group matches one or more disallowed operating system access groups.

15. An application processor device comprising:
an interface circuit configured to communicate with a modem device;
a user application module configured to execute one or more user-installed applications;
a core application module configured to execute one or more core applications and to access one or more modem services on the modem device, using the interface circuit and an IP socket application protocol interface (API), wherein packets sent to the modem device for accessing the one or more modem services include a destination IP address corresponding to the modem device; and
an IP filter module configured to identify and discard outbound packets that include a destination IP address corresponding to the modem device and that originate from any of one or more disallowed applications in the application processor, without sending the identified packets to the modem device,
wherein the IP filter module is configured to identify packets that originate from a disallowed application by identifying packets that originate from a disallowed category of applications, and
wherein the IP filter module is configured to identify packets that originate from a disallowed category of applications by distinguishing between packets that originate from an allowed "radio application" category and packets that originate from a disallowed "user application" category.

* * * * *